United States Patent [19]
Bower et al.

[11] Patent Number: 6,110,361
[45] Date of Patent: Aug. 29, 2000

[54] INTEGRATED SOIL AND FLUID DECONTAMINATION SYSTEM

[75] Inventors: C. George Bower, 183 Mack Hill Rd., Amherst, N.H. 03031; Allan W. Bernat, Lowell, Mass.

[73] Assignee: C. George Bower, Amherst, N.H.

[21] Appl. No.: 09/162,135

[22] Filed: Sep. 29, 1998

Related U.S. Application Data

[63] Continuation of application No. 08/696,499, Aug. 14, 1996, Pat. No. 5,814,234.

[51] Int. Cl.[7] ................................................. B01D 17/025
[52] U.S. Cl. ....................... 210/181; 210/252; 210/257.1; 210/512.1; 210/521; 210/DIG. 5; 34/108; 34/124; 110/210; 134/25.1
[58] Field of Search .................... 210/175, 177, 210/747, 770, 774, 804, 805, 806, 771, 779, 176, DIG. 5, 181, 198.1, 205, 252, 257.1, 512.1, 521; 110/236, 246, 346, 210; 134/25.1, 26; 405/128; 34/376–379, 108, 124; 55/341.1

[56] References Cited

U.S. PATENT DOCUMENTS

| | | | |
|---|---|---|---|
| 4,315,822 | 2/1982 | Jaisinghani | 210/794 |
| 5,055,196 | 10/1991 | Darian et al. | 210/638 |
| 5,195,887 | 3/1993 | Peterson et al. | 432/14 |
| 5,207,176 | 5/1993 | Morhard et al. | 110/246 |
| 5,227,071 | 7/1993 | Torline et al. | 210/651 |
| 5,252,138 | 10/1993 | Guymon | 134/42 |
| 5,256,208 | 10/1993 | Rafson | 134/25.1 |
| 5,288,330 | 2/1994 | Ballard | 134/25.1 |
| 5,344,255 | 9/1994 | Toor | 405/128 |
| 5,350,527 | 9/1994 | Kitko | 210/804 |
| 5,415,777 | 5/1995 | Krempen et al. | 210/747 |
| 5,461,186 | 10/1995 | Lebowitz et al. | 588/249 |
| 5,466,367 | 11/1995 | Coate et al. | 210/96.1 |
| 5,496,469 | 3/1996 | Scraggs et al. | 210/177 |
| 5,499,586 | 3/1996 | Davis | 110/246 |
| 5,552,051 | 9/1996 | Wang et al. | 210/604 |
| 5,619,936 | 4/1997 | Veltman | 210/512.2 |
| 5,814,234 | 9/1998 | Bower et al. | 210/770 |

*Primary Examiner*—Robert J. Popovics
*Attorney, Agent, or Firm*—Smith Patent Office

[57] ABSTRACT

A method for decontaminating both soil and mixed waste water polluted by hydrocarbons in a single integrated process is disclosed. Contaminated mixed waste fluid is separated into water and hydrocarbons which are then used in the thermal decontamination of polluted soil through the volatilization of hydrocarbon contaminants. Flue gases containing the volatilized hydrocarbons from the thermal soil decontamination undergo oxidation. Thermal energy from the soil decontamination process and the thermal oxidization of the flue gases can be recovered and used to facilitate the separation of hydrocarbons and water. In this integrated system, every by-product of each step is either decontaminated or consumed in another operation of the system. Energy conservation within this system is also realized by the use of heat exchangers to transfer energy from where it is created by the process to where it is used elsewhere to enhance efficiency within the process. It is possible to run this apparatus and process so that the only outputs of this system are decontaminated soil and clean exhaust gases.

19 Claims, 2 Drawing Sheets

INTEGRATED SOIL AND FLUID DECONTAMINATION SYSTEM

This application is a continuation of application Ser. No. 08/696,499 filed on Aug. 14, 1996, now U.S. Pat. No. 5,814,234.

BACKGROUND OF THE INVENTION

1. Field of the Invention

The invention relates to a method and apparatus for decontaminating oily mixed waste fluid containing water and soil polluted with hydrocarbons. This invention proposes a treatment method where the separated hydrocarbons and treated water are used in the process of treating the soil (also generally referred to as media).

2. Description of the Related Art

Many sites around the world are polluted in such a way that both the soil and any adjacent water are both contaminated by hydrocarbons from the same source. Systems previously dealt with this problem by using separate facilities for decontamination, one for soil decontamination, another facility for water decontamination. There are also a number of existing soil treatment facilities but they have no ability to treat the waste fluid in conjunction with the soil treatment process.

Jaisinghani (U.S. Pat. No. 4,315,822) discloses a system for the separation of oil and water from bilge water. Jaisinghani addressed the problem of inadvertent and undesired emulsification of the oil and water when the bilge was pumped out. Conventional pumping means used high pressure pumps as a matter of course, with the emulsification of the oil and water being the result. To remedy this, Jaisinghani chose to accomplish all the pumping within the system by one and only one low pressure, low emulsification pump for all of the various pumping jobs in the oil/water separation process.

A regenerative filter is used within the system disclosed by Jaisinghani to separate the oil from the water in the bilge. This regenerative filter required occasional backwashing to regenerate it. There was no provision for doing anything with the used backwash water other than to send it to a backwash water outlet as untreated waste.

Another shortcoming of the approach used by Jaisinghani is that by using only one pump type, the designer is forced to pick a pump that is only optimal for one or two of the many jobs required from the pump. For the other pumping jobs within the system, such as pumping the clarified water to its outlet, a low pressure and low emulsification pump is a less desirable pump for the job. Also, with only one pump, the system throughput is severely limited since only one step within the process could be done at any given time.

Torline et al. (U.S. Pat. No. 5,227,071) disclose a water decontamination system. This oil/water separation system has four or five stages that include a coalescer, an ultra filtration stage, an activated carbon filter, a cation exchange column, and an optional gravity separation stage and/or a clarification stage. The goal of Torline et al. was to treat contaminated mixed waste fluids, including those contaminated with heavy metals, to the point that they met the environmental regulations for discharge of the decontaminated water into surface waters.

A disadvantage to the system disclosed by Torline et al. is that there are a number of outflow products that require further treatment by other systems not mentioned in the disclosure before they can be safely disposed. These other outflow products include used backwash water from the activated carbon filter, heavy metal contaminated used backwash water from the cation exchange tower, and unprocessed sludge from the oil/water separator.

Another disadvantage to the system disclosed by Torline et al. is the inclusion of ion exchange, activated charcoal, and membrane filtration sub-systems. All of these systems have cost, maintenance, backwashing, and repair needs which require considerable effort and expense. The complexity of the system disclosed by Torline et al. was needed to have the treated water produced meet very strict standards so that it may be discharged directly into surface water. This incurs considerable complexity of design, expense, and the need to deal with an additional effluent outflow that itself requires further treatment by another decontamination system.

Kitko (U.S. Pat. No. 5,350,527) discloses a system for treating contaminated water to the point that it can be discharged into surface water. This system is intended for use in an industrial environment and includes a number of stages. In this system there are two stages of membrane filtration with successively smaller pore sizes followed by a heavy oil gravity separator, settling tanks, a light oil coalescer, an even finer pore size membrane filter, and finally an activated charcoal filter.

An alleged advantage to this system disclosed by Kitko is that the water treated could be continuously re-cycled in a closed loop. Despite this, there is no specific mention of how to deal with the contaminants that are entrapped by the various elements within the system. When this system is backwashed or cleaned, the resultant effluent is removed from the site and dealt with as contaminated waste, which incurs additional effort and expense. Another disadvantage to this system, like Jaisinghani and Torline et al., is the inclusion of a number of sub-systems such as an activated charcoal filter and a number of membrane filters that incur considerable effort and expense for their installation, maintenance, and repair.

Ballard et al. (U.S. Pat. No. 5,288,330) disclose a means and apparatus that decontaminates particulate matter, including sand, gravel, and soil. This is done in this system by washing the particulate matter to be decontaminated with heated water. This used heated wash water is then treated and reused within the process.

It is stated in the Ballard et al. disclosure that the wash water is to be heated to a temperature greater than the melting point of at least some of the contaminants. Also, if necessary for a specific pollutant being treated, acetic acid could be added to the heated wash water to dissolve heavy metals in the material being decontaminated. In this system the used wash water is purified by two gravity separation stages, activated charcoal filtration, ion exchange filtration, and a two stage membrane filtration with each having successively smaller pore sizes. After all of this filtration, the water is reused as wash water again.

There are a number of disadvantages and shortcomings with the system disclosed by Ballard et al. The temperature of the heated water used to melt contaminants is limited by its boiling point which would also limit its effectiveness. Also, the contaminants that are removed from the particulate matter being treated by the heated wash water are deposited into the various separation and filtration means. All of these sub-systems require their own cleaning by backwashing or other means, and the effluent from cleaning them produces contaminated waste that requires the additional effort and expense of treating them at another facility.

As in the disclosure by Torline et al., Ballard et al. also has a number of sub-systems requiring maintenance, backwashing, and repair, also incurring additional effort and expense.

Another system to decontaminate soil is disclosed by Guymon (U.S. Pat. No. 5,252,138). This method of treating contaminated soil, like that disclosed by Ballard et al. involves washing the contaminated soil with water. Unlike the Ballard et al. disclosure however, Guymon proposes the use of a non-ionic surfactant, a type of detergent, to remove hydrocarbon contaminants from the soil being treated. Guymon discloses the use of a specific group of surfactants to enable the wash water to dislodge oils from the soil.

Guymon makes no attempt to deal with the mechanics involved in treating the soil or cleaning the wash water used to treat the soil. Also, the issue of how to handle or dispose the recovered oily contaminants is not considered, leaving the operator with the effort and expense of treating these contaminants by other means.

A system to decontaminate sand or soil polluted by hydrocarbons is disclosed by Toor (U.S. Pat. No. 5,344,255). Like the Guymon disclosure, Toor uses a non-ionic surfactant, a type of detergent, in a water solution to wash the soil and then decontaminates the wash water so that it can be reused continuously. This system has an initial separation stage, at least one washing phase, at least one rinsing phase, an oil/water separator of the coalescer type, and a flocculation tank. Other embodiments disclosed by Toor also include one or more of the previously mentioned stages as well as one or more hydro-cyclones to remove particulate matter from the recycled wash water.

For all of its complexity, the Toor system does not provide for the disposal of the oil recovered or for the handling and disposal of contaminated fines and silt. These contaminated outputs must be processed by other means not included in this disclosure. This system also incurs additional expense because it continuously consumes detergent and flocculant that cannot be recycled or reused during operation.

Lebowitz (U.S. Pat. No. 5,461,186) discloses mixing of coal and water into the contaminated soil and then cooking this mixture to remove volatile contaminants. This step is followed by screening, dewatering, and finally, burning the mixture.

The mixture is heated and agitated while it is still wet, which limits the temperature in this step of the process to the boiling point of the water. This is not hot enough to volatilize all the contaminant hydrocarbons, but these other not yet volatilized hydrocarbons are consumed in the final step when the mixture is burned.

Burning coal as a decontamination strategy leaves the ecological clean-up problem of the entire coal burning process. Also there is no provision mentioned for treating the volatilized hydrocarbons from the hot water wash within the process. This contaminated waste must be treated and disposed of by some other means.

Nowhere in the related art is a system that fully integrates the two processes, one decontaminating soil and the other decontaminating mixed oily waste water, within a single processing facility in such a way that there is no contaminated output whatever.

SUMMARY OF THE INVENTION

It is accordingly an object of the invention to provide an apparatus and method for the decontamination of soil with the simultaneous environmentally safe separation and re-use of certain contaminated mixed waste fluids. Throughout this integrated system, every by-product of each step is either decontaminated, consumed in another operation within the system, or made available for re-use.

It is a further object of the invention to provide an apparatus and process that can be used in conjunction with a soil treating facility so as to improve its profitability, energy efficiency and reduce its environmental impact.

According to the objects of the present invention, contaminated mixed waste fluid containing water and hydrocarbon contaminants are separated into liquid hydrocarbons (free oil and hydrocarbons) and water. The hydrocarbons are either packaged for sale and re-use or used as alternative fuel for a thermal desorber in the soil decontamination portion of the system. The water from the oil/water separation is used to quench the hot decontaminated soil in a pug mill blender or other quenching device prior to release of the soil from the processing site. This water is also further treated in that during quenching upon contact with the hot decontaminated soil the quenching water, along with any residual contaminants, immediately vaporizes with these vapors being scavenged into the flue gas treatment system where it is processed.

It is also an object of this invention to avoid the use of high cost items that require extensive maintenance such as ion exchange filters, membrane filters, and activated charcoal filters. This results in a system that is much more economical to build and operate than the prior art which includes expensive and maintenance intensive sub-systems not needed for the present invention.

The oil/water separation process works in conjunction with the soil decontamination process. Soil decontamination is accomplished by thermally treating the soil in a thermal desorber, an apparatus that can be heated by electricity, natural gas, furnace oil, or the free oil and hydrocarbons recovered within this system. The thermal desorber heats the soil which removes the hydrocarbon contaminants from the contaminated soil by volatilizing them.

The flue gases containing volatilized hydrocarbons from the treated soil in the thermal desorber pass through a thermal or catalytic oxidizer. The flue gases and vapors from various other elements within the system undergo oxidation in the oxidizer. The exhaust gases from the oxidizer pass through a flue gas heat exchanger or other means to cool the flue gases. The flue gas heat exchanger thus provides thermal energy for use elsewhere in the process.

Although it is not necessary in the present invention, local conditions and/or the nature of the contamination from a specific site may make it be appropriate to have an acid gas scrubber treat the flue gases. Water to be mixed with either the caustic soda or the lime for the acid gas scrubber can come from the oil/water separation part of the process.

The flue gases can then pass through a baghouse filter or other filtration means to remove any remaining particulate matter before the decontaminated, substantially cleaned, and environmentally safe exhaust gases are discharged into the atmosphere. Particulate matter that is removed from the flue gases by the baghouse filter, or other particulate matter separation means, is transferred to the pug mill blender or other quenching means for further treatment and mixing with the decontaminated soil. It is also possible when dealing with contaminants that have a low temperature of volatilization to have the baghouse filter placed in the flue gas flow after the thermal desorber and before the flue gas oxidizer.

To conserve energy, thermal energy from the flue gas heat exchanger in the form of heated liquid is recovered and transferred by heated liquid-to-liquid heat exchangers to the contaminated mixed waste fluid entering the oil/water separator as well as to the clean backwash water used to regenerate the coalescer. Heating the contaminated mixed waste fluid reduces its viscosity which facilitates the separation of water from hydrocarbons within the oil/water separator in accordance with Stoke's Law. Heating the clean water used for backwashing the coalescer significantly enhances backwashing efficiency.

Within the scope of the present invention, the contaminated mixed waste water entering the oil/water separator and the clean water used to backwash the coalescer can alternatively be heated either by a hot air-to-liquid heat exchanger or other means, including but not limited to, electric, solar, or fuel burning fluid heating devices.

From the fluid handling part of the operation, settled solids (hereafter referred to as sludge) from the oil/water separator are sent to the contaminated soil input where they are mixed and treated with the soil being decontaminated. The separated oils and hydrocarbons can be used as an alternative fuel burned in the rotary dryer to thermally treat the contaminated soil or they could be packaged for sale or be re-refined. The water from the oil/water separator is pumped through a coalescer for further purification prior to its use in quenching the hot decontaminated soil.

The coalescer is periodically backwashed in order to regenerate its capability to purify water. In the preferred design, heating of the backwash water is done with a heated liquid-to-liquid type of heat exchanger which receives its thermal energy from the flue gas heat exchanger. It is also possible to use a hot air-to-liquid type of heat exchanger or other means, including but not limited to, electric, solar, or fuel burning fluid heaters to heat the backwash water prior to its entering the coalescer.

The used backwash water is piped back into the oil/water separator or the bulk oily waste water storage tank where it is mixed and processed with the rest of the contaminated mixed waste fluid being processed. The water from the coalescer is used to quench the thermally treated, high temperature decontaminated soil before it is removed from the treatment site.

By using the water decontaminated within the system to quench hot soil, it is not necessary to purify the water to the point that it meets the strict standards for discharge into surface waters. In the present invention, since the water is used to quench hot soil, suspended particulate solids in the water simply become part of the soil being quenched. The extra filtration means that are not required result in a significant savings to the plant operator. The water itself is further treated in that when it is used to quench the hot soil from the thermal desorber in the quenching apparatus, it is vaporized upon contact with the soil and the water vapor and any remaining contaminants in it are ducted to the oxidizer where it is processed with the flue gases.

Energy used in this invention is conserved because fuel that is recovered from the fluid being processed reduces the amount of fuel needed from sources outside the system to thermally treat the soil. Water from the fluid being decontaminated is used to quench the hot decontaminated soil instead of water resources from outside the process. Energy is also conserved when thermal energy from the treatment of contaminated soils is recovered and used elsewhere in the process to improve the efficiency of the separation of hydrocarbons from water in the oil/water separator (Stoke's Law) and to improve the efficiency of the backwashing of the coalescer.

The products of both the fluid handling portion and the soil decontamination portion of this process are used to enhance each other in an integrated and synergistic operation. The only outputs of this fully integrated process are oil for re-use (if profitable), decontaminated environmentally safe soil, and exhaust gases which meet stringent standards.

BRIEF DESCRIPTION OF THE DRAWINGS

The above and other objects and features of the present invention will be clearly understood from the following description with respect to the preferred embodiments thereof when considered in conjunction with the accompanying drawings, in which.

Figure 1:
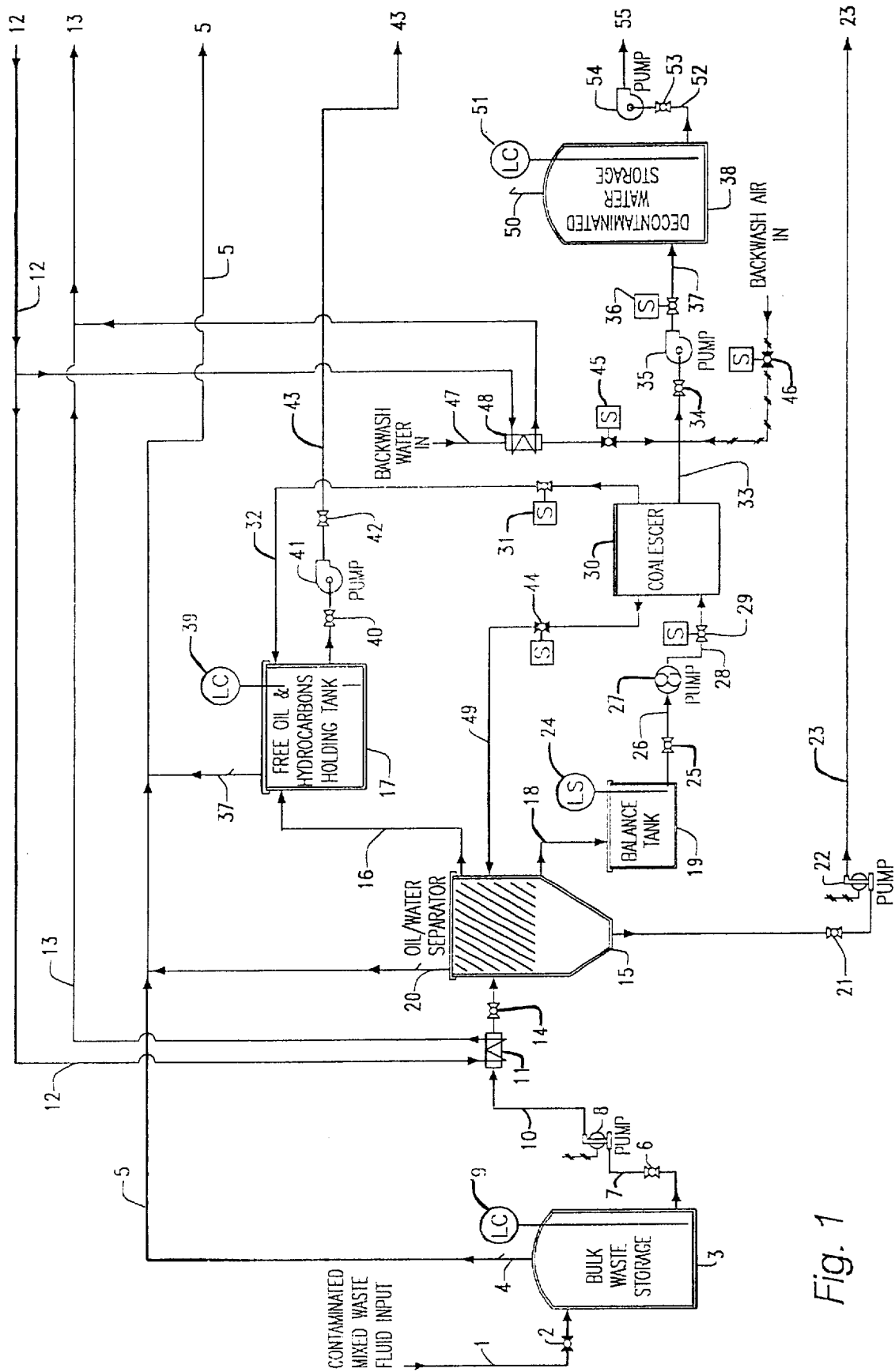
FIG. 1 is a schematic representation of the fluid separation portion of the invention.
Figure 2:
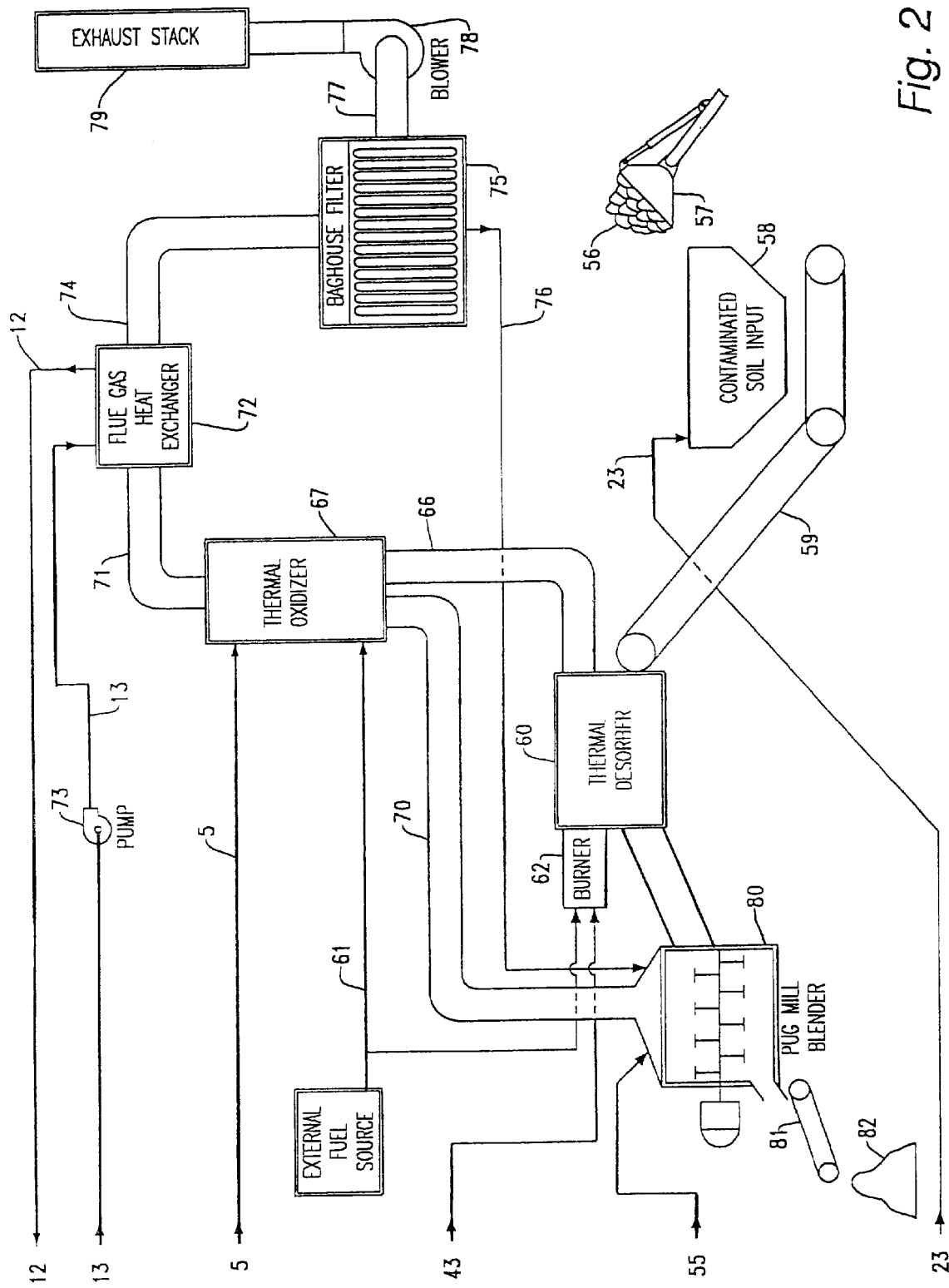
FIG. 2 is a schematic representation of the soil decontamination portion of the invention.

While the present invention can be modified into a variety of alternate configurations, the specific embodiments shown as an example in the drawings will be described in detail. Within the scope of the present invention it should be understood that the drawings with their detailed descriptions are not intended to limit the invention to the any particular form disclosed in the preferred embodiments. Rather, the intention is to include all of the alternatives, modifications, and equivalents as defined by the claims.

DETAILED DESCRIPTION OF THE PREFERRED EMBODIMENTS

The invention will be described in further detail with an illustrative preferred embodiment for treating water and soil contaminated by hydrocarbons in an integrated process that has decontaminated environmentally safe exhaust gases and decontaminated environmentally safe soil as its only outputs.

Contaminated mixed waste fluid containing various hydrocarbons, and/or halogenated hydrocarbons, including but not limited to, bilge water, tank farm run-off, oil refinery run-off, industrial process effluent, and contaminated ground or surface water are transferred through a contaminated mixed fluid input line 1 and a normally closed manually operated valve 2 into a bulk waste storage tank 3. A vent 4 mounted on the bulk waste storage tank 3 is connected to a vent vapor duct 5. Hydrocarbon vapors are drawn through the vent vapor duct 5 by negative air pressure into a thermal (or catalytic) oxidizer 67 for treatment with the flue gases. The entire flue gas stream is under negative air pressure to ensure that there is no leakage or fugitive emissions.

Within the scope of the present invention the vent vapor duct 5 could discharge into any place in the flue gas stream before the thermal oxidizer 67 so that any hydrocarbon vapors from the contaminated mixed waste fluid in the bulk waste storage tank 3 would be safely consumed within the system. Contaminated mixed waste fluid from the bulk waste storage tank 3 is drawn through a normally open manually operated valve 6 onward through a line 7 to an air operated diaphragm type feed pump 8. Within the scope of the present invention other pumping means could be used in place of the air operated diaphragm pump 8.

When a level control 9 is satisfied, the air operated diaphragm pump 8 transfers the contaminated mixed waste fluid through a line 10 and through a heated liquid-to-liquid heat exchanger 11 which receives its thermal energy from a heated gas-to-liquid flue gas heat exchanger 72 through a liquid thermal transfer medium line 12. A liquid thermal transfer medium return line 13 provides the means by which the liquid thermal transfer medium is returned to the heated gas-to-liquid flue gas heat exchanger 72. The liquid thermal transfer medium is circulated by a thermal transfer medium circulation pump 73 of the centrifugal type. Within the scope of the present invention this liquid thermal transfer medium circulation pump 73 could be of any of a number of types of pump, but the preferred type is centrifugal in its function.

The pre-heated contaminated mixed waste fluid flows from the heat exchanger 11 through a normally open manually operated valve 14 into a gravity oil/water separator 15. This gravity oil/water separator 15 in the preferred embodiment would be of the type similar to that marketed by Monarch Separators, Inc. Within the gravity oil/water separator 15, as a result of pre-heating of the contaminated mixed waste fluid by the heat exchanger 11, separation of the hydrocarbons (including oil) from the water is accelerated. This acceleration of the separation process is a manifestation of Stoke's Law in that heating of the contaminated mixed waste fluid reduces its viscosity, which in turn accelerates the gravity separation of hydrocarbons from the water.

Hydrocarbons (including oil) from the gravity oil/water separator 15 flow through a line 16 into a free oil and hydrocarbons holding tank 17. Water from the gravity oil/water separator 15 flows through an inlet line 18 into a balance tank 19. Any hydrocarbon vapors within the gravity oil/water separator 15 pass through a vent 20 and are drawn into the vent vapor duct 5 by negative air pressure into the thermal oxidizer 67 where it is oxidized with the rest of the hydrocarbon flue gases.

Periodically, when the sludge build up in the gravity oil/water separator 15 has reached a certain level, the sludge is drawn through a normally open manually operated valve 21 by an air operated diaphragm type sludge pump 22. The sludge, now under pressure from the air operated diaphragm sludge pump 22 is pumped through a sludge outlet line 23 to a contaminated soil input 58. Within the scope of this invention it is possible to replace the air operated diaphragm sludge pump 22 with any of a number of other pump types, but the pump specified for the preferred embodiment is of the air operated diaphragm type.

When a level control 24 is satisfied, water from the balance tank 19 flows through a normally open manually operated valve 25 and a line 26 to a positive displacement type feed pump 27 which pumps the separated water through an inlet line 28 and through a normally open solenoid valve 29 to a coalescer 30 for further purification. In the preferred embodiment this coalescer 30 is of the type similar to that marketed by Exxon Research Corp. The oleophilic filtration media that accomplishes the coalescing action within the coalescer 30 is of the type disclosed by Hall et al. (U.S. Pat. No. 4,172,031). Liquid hydrocarbons (including oil) from the coalescer 30 flow through a normally open solenoid valve 31 and a hydrocarbons outlet line 32 into the free oil and hydrocarbons holding tank 17.

The hydrocarbons in the free oil and hydrocarbons holding tank 17 can either be packaged for sale and re-use or re-refined or used as fuel for the soil decontamination process. Free oil and hydrocarbons holding tank 17 has any hydrocarbon vapors removed through a vent 37 by negative air pressure into the vent vapor duct 5 to the thermal oxidizer 67 where the vent vapors are consumed.

Purified water from the coalescer 30 is drawn through a water line 33 and through a normally open manually operated valve 34 into a centrifugal transfer pump 35. Although a centrifugal pump is preferred, within the scope of the present invention it is possible to use any of a number of types of pump as a substitute for the transfer pump 35. Outflow from the transfer pump 35 passes though a normally open solenoid valve 36 and a water line 37 to a decontaminated water storage tank 38.

When a level control 39 in the free oil and hydrocarbons holding tank 17 is satisfied, hydrocarbon fluid from it is drawn through a normally open manually operated valve 40 by a centrifugal transfer pump 41. Although the centrifugal design is preferred for transfer pump 41, within the scope of the present invention there are other types of pump that could also be used for this function. The flow from the transfer pump 41 passes through a normally open manually operated valve 42 and an alternative fuel line 43 to an internal fuel burner 62 where the hydrocarbons are burned as an alternative fuel source or mixed with fuel from an external fuel source line 61 and then burned to provide thermal energy for a thermal desorber 60. Supplying this alternative fuel to burn in the thermal desorber's internal fuel burner 62 reduces the need for fuel from outside the system.

Although in this preferred embodiment the thermal desorber 60 is of the rotary type with an internal fuel burner, it is within the scope of the present invention to have the alternative of an externally mounted fuel burner in place of the thermal desorber's internal fuel burner 62, and to have the thermal desorber 60 be a conveyor or other type known in the art.

To periodically clean and regenerate the coalescer 30, it goes through a backwash cycle. To initiate the backwash of the coalescer 30, the positive displacement pump 27 and the transfer pump 35 are stopped, the normally open solenoid valve 29 on the inlet line 28 closes, the normally open solenoid valve 36 on the water line 37 closes, and the normally open solenoid valve 31 on the hydrocarbons outlet line 32 also closes. A normally closed solenoid valve 44 which controls the flow through a backwash outlet line 49 of used backwash water out of the coalescer 30 into the gravity oil/water separator 15 opens. A normally closed solenoid valve 45 controls the flow of clean backwash water through a heated liquid-to-liquid heat exchanger 48, through a backwash water inlet line 47 and the water line 33 to the coalescer 30. The source of thermal energy for the backwash water is the heated liquid-to-liquid heat exchanger 48 which in turn gets its thermal energy from the heated gas-to-liquid flue gas heat exchanger 72. The normally closed backwash water solenoid valve 45 is cycled opened and closed alternately with a normally closed compressed air inlet solenoid valve 46 which controls the compressed air entering through the water line 33 to the coalescer 30.

During the backwash cycle, when the normally closed backwash water solenoid valve 45 is opened, the normally closed compressed air inlet solenoid valve 46 is closed. After a short period of time, the normally closed backwash water solenoid valve 45 closes and the normally closed compressed air solenoid valve 46 opens. The two normally closed solenoid valves 45 and 46 alternate states with each other for the duration of three quarters of the backwash cycle. Mixed air and hot water flow through the oleophilic filtration media within the coalescer 30 causing the oleophilic filtration media inside the coalescer 30 to release the coalesced contaminants into the backwash water.

The used backwash water leaves the coalescer 30 through the now open but normally closed solenoid valve 44 and through the backwash outlet line 49 to the gravity oil/water separator 15 where it is treated with the contaminated mixed waste fluid. Within the scope of the present invention it is also possible to have the backwash outlet line 49 go to the bulk waste storage tank 3 where it would discharge the used backwash water into the contaminated mixed waste fluid so that it would be processed with it.

For the last fourth of the backwash cycle, the normally closed compressed air solenoid valve 46 closes and stays closed while the normally closed backwash water solenoid valve 45 stays open effecting a final water rinse of the coalescer 30 which finishes the backwash cycle. When the backwash cycle for the coalescer 30 ends, the normally open solenoid valves 29, 31, and 36 all open, returning them to their normal operating state. The normally closed solenoid valves 44, 45, and 46 all close, returning them to their normal operating state. It is also possible to use other timing cycles for the backwashing process within the scope of this invention. After the solenoid valves have all returned to their normal operating state, the coalescer 30 returns to its primary function of removing as much of the hydrocarbons from the water as possible.

Other options within the scope of the present invention to heat the backwash water which would replace the heated fluid-to-fluid backwash water heat exchanger 48 include, but are not limited to, either a heated air-to-liquid heat exchanger or fluid heaters that are electrical, solar, or fuel burning in their operation.

Substantially purified water from the coalescer 30 is drawn through the water line 33 and the normally open manually operated valve 34 into the transfer pump 35. The outflow from the transfer pump 35 passes through the normally open solenoid valve 36 and water line 37 to the decontaminated water storage tank 38 where it is kept for use elsewhere within the process.

A vent 50 attached to decontaminated water storage tank 38 is open to the atmosphere. When a level control 51 on the decontaminated water storage tank 38 is satisfied, decontaminated water can be drawn through a water line 52 and through a normally open manually operated valve 53 by a centrifugal transfer pump 54. Although the preferred pump for this function is of the centrifugal type, other pump types can also be used in this position within the scope of this invention. The outflow of the transfer pump 54 flows through a water line 55 to the soil quenching means or soil conditioner such as a pug mill blender 80 where it is used to quench hot decontaminated soil from the thermal desorber 60.

In the soil decontamination portion of the system, contaminated soil 56 is transferred by a payloader bucket 57 (or other means) into the contaminated soil input 58 where it is then moved by a conveyer belt 59 (or other means) into the thermal desorber 60. The thermal desorber 60 can be a rotary dryer or other soil treatment devices known in the art. Fuel (such as, but not limited to, piped in natural gas or fuel oil) from an outside source fuel line 61 is burned by a burner 62 as the primary source of thermal energy for the thermal desorber 60. Alternative fuel from the hydrocarbon tank 17 can also be burned in the thermal desorber's internal burner 62. These two fuel sources can either be alternated or mixed together before burning.

Thermal volatilization of the contaminant hydrocarbons in the heated soil takes place inside the thermal desorber 60. Flue gases from the soil being thermally processed containing volatilized hydrocarbons pass through a flue gas duct 66 into the thermal (or catalytic) oxidizer 67. Hydrocarbon vapors from the tank vents 4, 20, and 37 are drawn through the vent vapor duct 5 by the negative air pressure of the entire flue gas treatment stream into the thermal (or catalytic)oxidizer 67. Air to aid in the combustion of the volatilized hydrocarbons is drawn through a line 70 by negative air pressure into the thermal oxidizer. Fuel (such as, but not limited to, piped in natural gas) from the outside source fuel line 61 also enters the thermal oxidizer 67 where volatilized hydrocarbons in the flue gases, the vent vapors, and the vaporized quench water are consumed in a thorough combustion process. After having been thoroughly combusted in the thermal (or catalytic) oxidizer 67, the hot flue gases entering a flue gas duct 71 are, at this point, substantially decontaminated.

Hot flue gases from the thermal oxidizer 67 pass through the flue gas duct 71 into the heated gas-to-liquid flue gas heat exchanger 72 which provides thermal energy for use elsewhere in the process. Liquid thermal transfer medium is moved through the heated gas-to-liquid flue gas heat exchanger 72 by liquid thermal transfer medium circulation pump 73. The heated liquid passes through the liquid thermal transfer medium line 12 to the heated liquid-to-liquid heat exchanger 11 for pre-heating of the contaminated mixed waste water entering the gravity oil/water separator 15 and to the liquid-to-liquid heat exchanger 48 to pre-heat the backwash water used to backwash the coalescer 30. Fluid thermal transfer medium returns from the heat exchangers 11 and 48 through the liquid thermal transfer medium return line 13 to the liquid thermal transfer medium circulation pump 73 and then back to the heated gas-to-fluid heat exchanger 72. Flue gases cooled by their passage through heat exchanger 72 (or other means to reduce its temperature) travel through flue gas duct 74 to a baghouse filter 75. In some cases, such as when treating soil polluted by hydrocarbons with a low temperature of volatilization, the baghouse filter 75 can be placed after the thermal desorber 60, and before the oxidizer 67, within the scope of the present invention.

Energy conservation is the driving consideration to use heat exchangers in this system to provide thermal energy for pre-heating the contaminated mixed waste fluid entering the oil/water separator 15 and for pre-heating the backwash water used to regenerate the coalescer 30. The use of a liquid thermal transfer medium is preferred in this embodiment of the invention for the collection of thermal energy from the high temperature flue gases and the transfer of thermal energy to the contaminated mixed waste fluid entering the oil/water separator 15 and the backwash water entering the coalescer 30 during the backwash cycle.

It is also possible to have the heat exchangers 11 and 48 replaced by electrical, solar, or fuel burning fluid heaters to pre-heat the contaminated mixed waste fluid and the backwash water. The heated gas-to-liquid flue gas heat exchanger 72 could be, in the event that energy conservation is not a priority, replaced by devices such as, but not limited to, a radiator to reduce the flue gas temperature before it enters a flue gas duct 74.

Although not part of the present invention, under certain conditions, such as dealing with certain contaminants, it might be appropriate to include an acid gas scrubber of the type marketed by Tarmac Equipment Company, Inc., as an element within the system. This acid gas scrubber would most likely be inserted into the flue gas flow after the thermal (or catalytic) oxidizer 67 and before the baghouse filter 75. The acid gas scrubber would require either caustic soda or lime to be mixed with water in order to operate. This water would come from the decontaminated water storage tank 38 through the decontaminated water line 55. Acid gas scrubbers have a sludge output that in this system can be handled by having this sludge pumped to either the contaminated soil input 58 or directly into the rotary dryer 60.

If it is not practical to process this sludge with the soil being decontaminated, then conventional means would be used to dispose of it.

In the baghouse filter 75, any remaining particulate matter still in the flue gases is filtered out and sent through a line 76 to the pug mill blender 80 or other quenching means for treatment with the decontaminated soil. Flue gases, now substantially decontaminated and environmentally safe, are drawn out of the baghouse filter 75 through a duct 77 by an exhaust blower 78 through an exhaust stack 79 out into the atmosphere. This exhaust blower 78 can also be responsible for the negative air pressure of the entire flue gas treatment system.

Hot decontaminated soil from the thermal desorber 60 is transferred directly to the pug mill blender 80. Water from the decontaminated water storage tank 38 is drawn through the water line 52 and the normally open manually controlled valve 53 by the transfer pump 54. The outlet of the transfer pump 54 flows through the water line 55 to the pug mill blender 80 or other means to quench the decontaminated soil coming from the thermal desorber 60. When the water comes into contact with the hot soil in the pug mill blender 80, it is vaporized and drawn through duct 70 by negative air pressure into the oxidizer 67 where the water vapor and any remaining contaminants are consumed by combustion. If needed, this process of using the decontaminated water in quenching acts as a further treatment process for the water since any remaining hydrocarbons are volatilized. A conveyor 81 then moves this soil 82, now substantially decontaminated and environmentally safe, to an on-site holding area where it is stored prior to re-use.

The individual elements that process the flue gas from the rotary dryer 60 need not be in the exact order specified in the preferred embodiment to come within the scope of the present invention.

It is understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A decontamination apparatus comprising:
   an oil/water separator for separating oil and water from contaminated mixed waste fluid, said oil/water separator having a mixed waste fluid inlet, an oil outlet, a water outlet, and a sludge outlet;
   a coalescer for treating water separated in said oil/water separator to remove remaining hydrocarbons based compounds, said coalescer having a water inlet operatively connected to said water outlet of said oil/water separator, said coalescer including a decontaminated water outlet and a hydrocarbon based compounds outlet;
   a thermal desorber having a contaminated soil input that receives contaminated soil, said thermal desorber having a decontaminated soil output, a flue gas outlet, and a means for heating the soil;
   a soil quenching device for cooling down decontaminated soil, said soil quenching device having a decontaminated soil input operatively connected to said decontaminated soil output of said thermal desorber, and a decontaminated and quenched soil output; and
   an oxidizer having a flue gas inlet operatively connected to said flue gas outlet of said thermal desorber, a fresh air inlet, and a decontaminated exhaust gas outlet.

2. A decontamination apparatus as claimed in claim 1, wherein said oil/water separator is a gravity oil/water separator.

3. A decontamination apparatus as claimed in claim 1, wherein said oil/water separator is a hydrocyclone separator.

4. A decontamination apparatus as claimed in claim 1, wherein said oxidizer is a thermal oxidizer.

5. A decontamination apparatus as claimed in claim 1, wherein said oxidizer is a catalytic oxidizer.

6. A decontamination apparatus as claimed in claim 1, wherein said soil quenching device is a pug mill blender.

7. A decontamination apparatus as claimed in claim 1, wherein said soil quenching device includes a drum and means for spraying water onto the treated soil.

8. A decontamination apparatus as claimed in claim 1, wherein said oxidizer further includes a hydrocarbon vapor inlet, and said apparatus further comprising a means for ducting hydrocarbon vapors from said oil/water separator to said hydrocarbon vapor inlet.

9. A decontamination apparatus as claimed in claim 8, further comprising a flue gas heat exchanger receiving flue gases from said exhaust gas outlet of said oxidizer and transferring heat from the flue gases to a heat exchange medium.

10. A decontamination apparatus as claimed in claim 9, further comprising a preheat waste fluid heat exchanger located in proximity to said oil/water separator and wherein said heat exchange medium passes from said flue gas heat exchanger to said preheat waste fluid heat exchanger for preheating the mixed waste fluid prior to entry into said oil/water separator.

11. A decontamination apparatus as claimed in claim 9, further comprising a preheat backwash heat exchanger located in proximity to said coalescer and a backwash water inlet for providing backwash water, wherein said heat exchange medium passes from said flue gas heat exchanger to said preheat backwash heat exchanger for preheating the backwash water prior to entry into said coalescer.

12. A decontamination apparatus as claimed in claim 1, further comprising a filter operatively connected to said exhaust gas outlet of said oxidizer so as to remove particulate matter before gases from said oxidizer are exhausted to the atmosphere.

13. A decontamination apparatus as claimed in claim 1, wherein said thermal desorber comprises a rotary dryer.

14. A decontamination apparatus as claimed in claim 13, further comprising a baghouse filter disposed between said rotary dryer and said oxidizer.

15. A decontamination as claimed in claim 1, further comprising a hydrocarbon holding tank and wherein said means for heating the soil comprises a fuel burner, said fuel burner being operatively connected to said holding tank.

16. A decontamination apparatus as claimed claim 1, wherein said thermal desorber comprises a conveyor.

17. A decontamination as claimed in claim 1, wherein said thermal desorber comprises means for directly heating the soil.

18. A decontamination apparatus as claimed in claim 1, wherein said thermal desorber comprises means for indirectly heating the soil.

19. A decontamination apparatus comprising:
   an oil/water separator for separating oil and water from contaminated mixed waste fluid, said oil/water separator having a mixed waste fluid inlet, an oil outlet, a water outlet, and a sludge outlet;
   a coalescer for treating water separated in said oil/water separator to remove remaining hydrocarbons based compounds, said coalescer having a water inlet operatively connected to said water outlet of said oil/water separator, said coalescer including decontaminated water outlet and a hydrocarbon based compounds outlet;

a thermal desorber having a contaminated soil input that receives contaminated soil, said thermal desorber having a decontaminated soil output, a flue gas outlet, and a means for heating the soil; and a soil quenching device for cooling down decontaminated soil, said soil quenching device having a decontaminated soil input operatively connected to said decontaminated soil output of said thermal desorber, and a decontaminated and quenched soil output.

* * * * *